J. H. W. KEPLER.
RESILIENT WHEEL.
APPLICATION FILED AUG. 28, 1912.
1,069,553.
Patented Aug. 5, 1913.
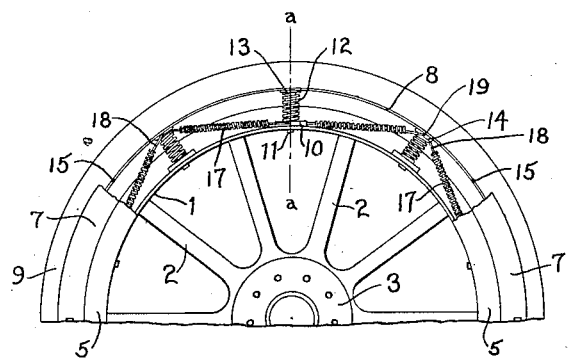
Fig. 1
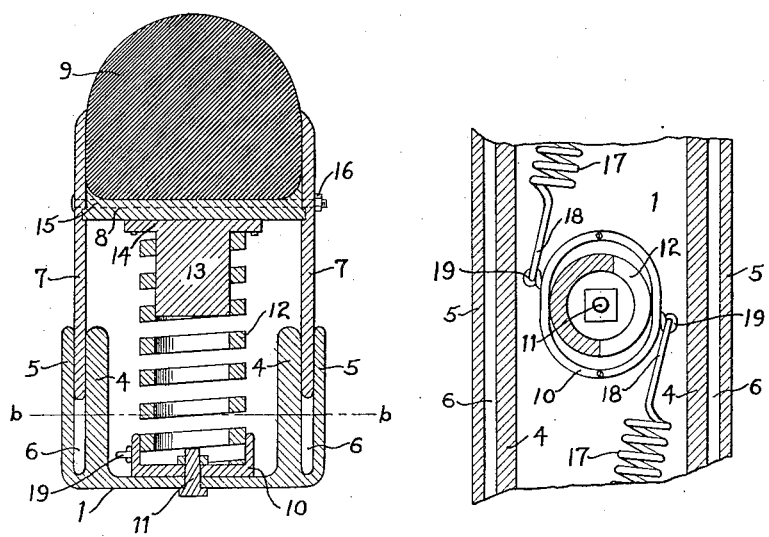
Fig. 2
Fig. 3
Witnesses
Elwood H. Herbig
Parke McCoy
Inventor
Jesse H. W. Kepler
By Howard S. Smith,
His Attorney

UNITED STATES PATENT OFFICE.

JESSE H. W. KEPLER, OF PREBLE COUNTY, NEAR EATON, OHIO.

RESILIENT WHEEL.

1,069,553.  Specification of Letters Patent.  Patented Aug. 5, 1913.

Application filed August 28, 1912. Serial No. 717,469.

*To all whom it may concern:*

Be it known that I, JESSE H. W. KEPLER, a citizen of the United States, residing in the county of Preble, near the city of Eaton, State of Ohio, have invented a new and useful Improvement in Resilient Wheels, of which the following is a specification.

This invention relates to new and useful improvements in resilient wheels.

The object of my invention is to provide a resilient wheel that will be an effective substitute for wheels, especially those of automobiles, which are equipped with pneumatic tires. With this end in view I employ a spring construction which is positioned between the tire and felly to take up or absorb as effectively as possible, the shocks and vibration to which a wheel is incident when traveling over a rough surface.

In the accompanying drawings, Figure 1 is a side elevation of a portion of the wheel with parts broken away. Fig. 2 is a diametrical section of the same taken on the line $a$—$a$ of Fig. 1. And Fig. 3 is a horizontal section taken immediately below the line $b$—$b$ of Fig. 2.

Throughout the specification and drawings, similar reference characters denote corresponding parts.

In a detailed description of my invention, 1 designates a rim supported by spokes 2 secured to a hub 3 of a wooden or metallic wheel. The rim 1 is preferably constructed of metal so cast as to provide near each edge thereof two upwardly projecting flange portions 4 and 5. Each of these flange portions 4 and 5 are spaced apart a sufficient distance to provide between them an annular groove 6. Movable within these grooves 6—6 are two parallel circumferential side members 7—7 which support near their top portions a horizontally disposed circular plate 8. Supported by the plate 8 in a position between the upper portions of the side members 7—7 is a tire 9, preferably constructed of hard rubber. (See Fig. 2.)

Mounted approximately midway between each two of the spokes 2, upon the rim 1, is a metallic oval-shaped cup 10 which is firmly attached to the rim 1 by a bolt 11. Resting within each of the cups 10 is a coil spring 12, the upper portion of which encircles a post 13 which is supported by a disk 14 suitably secured to the plate 8. When any one of the springs 12 is in a position to receive the weight of the wheel, the said spring will be compressed, and when the tire passes over an uneven or rough place in the road, the said spring will be further compressed to prevent the full shock of such contact being communicated to the body of the automobile.

The springs 12, during their compression and extension, are guided or kept as nearly in a vertical position as possible, by the side members 7—7 moving within the grooves 6—6. This side member and groove construction also makes it possible for the tire 9 to be at all times supported by the springs 12, which form a cushion for the said tire to neutralize the shocks to which it is exposed. The springs 12 are preferably constructed of steel, and are of sufficient strength to prevent the plate 8 contacting with the flange portions 4 and 5 under severe shocks and impacts.

In order that the tire 9 may be readily removed when desired, the plates 7—7 are connected by a bolt 15, which may be easily pulled out and the plates 7—7 spread apart to release the tire, by unscrewing the nut 16. To prevent the springs 12 being subjected to shearing due to lateral movement during their compression and extension, the cups 10 in which they rest are made oval, as before stated. (See Fig. 3.)

In order that the tire 9 may not slip around the wheel in either direction as the latter rotates, brace springs 17 are provided. Each of these springs 17 has hook-shaped ends 18 which are received by eye pieces 19 secured to the cups 10 and disks 14. These springs 17 are so arranged that one extends from a disk 14 to a cup 10, the next adjoining one from the cup 10 to a disk 14, and the next adjoining one from the disk 14 to a cup 10, and so on around the wheel. This arrangement of said springs permits them to act as yieldable stays to prevent the tire moving any appreciable distance in either direction.

I do not wish to be limited to the particular embodiments of the invention herein shown and described, and any changes or modifications may be made therein within the scope of the subjoined claim.

Having described my invention, I claim:

In a resilient wheel, the combination with a rim, said rim having two flange portions extending upwardly from each circumferential edge thereof, a circumferential side member movable between each two or said flange portions, a circular plate supported by said side members and positioned between the same, a rubber tire resting upon said circular plate between the upper portions of said side members, coil springs mounted at suitable distances apart between the circular plate and rim, cups supported by the rim to receive the bottom portions of said springs, said cups being oval to prevent shearing of said springs during their yielding movement, and posts secured to said circular plate to receive the upper portions of said springs, said springs forming a cushion for said tire and being guided during their compression and extension by the side members moving between the flange portions of the rim, substantially as described.

In testimony whereof I have hereunto set my hand this 22nd day of August, 1912.

JESSE H. W. KEPLER.

Witnesses:
HOWARD S. SMITH,
PARKE MCCOY.

Copies of this patent may be obtained for five cents each, by addressing the "Commissioner of Patents, Washington, D. C."